US012314805B2

(12) United States Patent
Tang et al.

(10) Patent No.: US 12,314,805 B2
(45) Date of Patent: *May 27, 2025

(54) USER-BASED VEHICLE DETERMINATION

(71) Applicant: Capital One Services, LLC, McLean, VA (US)

(72) Inventors: Qiaochu Tang, The Colony, TX (US); Geoffrey Dagley, McKinney, TX (US); Micah Price, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,892

(22) Filed: Feb. 21, 2024

(65) Prior Publication Data

US 2024/0193383 A1    Jun. 13, 2024

Related U.S. Application Data

(63) Continuation of application No. 17/662,133, filed on May 5, 2022, now Pat. No. 11,928,543, which is a continuation of application No. 17/246,990, filed on May 3, 2021, now Pat. No. 11,354,524.

(51) Int. Cl.
*G06K 7/10* (2006.01)
*G06Q 30/0601* (2023.01)

(52) U.S. Cl.
CPC ..... *G06K 7/10366* (2013.01); *G06Q 30/0625* (2013.01)

(58) Field of Classification Search
CPC ........................ G06K 7/10366; G06Q 30/0625
See application file for complete search history.

(56) References Cited

U.S. PATENT DOCUMENTS

| 8,437,776 | B2 | 5/2013 | Busch |
| 9,697,539 | B2 | 7/2017 | Emigh et al. |
| 2013/0030915 | A1 | 1/2013 | Statler et al. |
| 2014/0125461 | A1 | 5/2014 | Liao |
| 2014/0148196 | A1 | 5/2014 | Bassan-Eskenazi et al. |
| 2015/0161564 | A1 | 6/2015 | Sweeney et al. |

FOREIGN PATENT DOCUMENTS

CA    2823693 C    5/2017

*Primary Examiner* — Jamara A Franklin
(74) *Attorney, Agent, or Firm* — Bookoff McAndrews, PLLC

(57) ABSTRACT

Computer-implemented techniques and systems for generating vehicle profiles may include scanning a plurality of vehicles, each vehicle located at a respective vehicle location, identifying respective vehicle locations for each of the plurality of vehicles, based on scanning the plurality of vehicles, associating a vehicle identification tag for each vehicle with its respective vehicle location, interpreting a signal to determine a user location, determining that the user location is within a threshold distance from a first vehicle location of a first vehicle from the plurality of vehicles, providing a first vehicle identification tag corresponding to the first vehicle based on determining that the user location is within the threshold distance, generating a first vehicle profile based on the first vehicle identification tag, and providing the first vehicle profile to a user device.

20 Claims, 9 Drawing Sheets

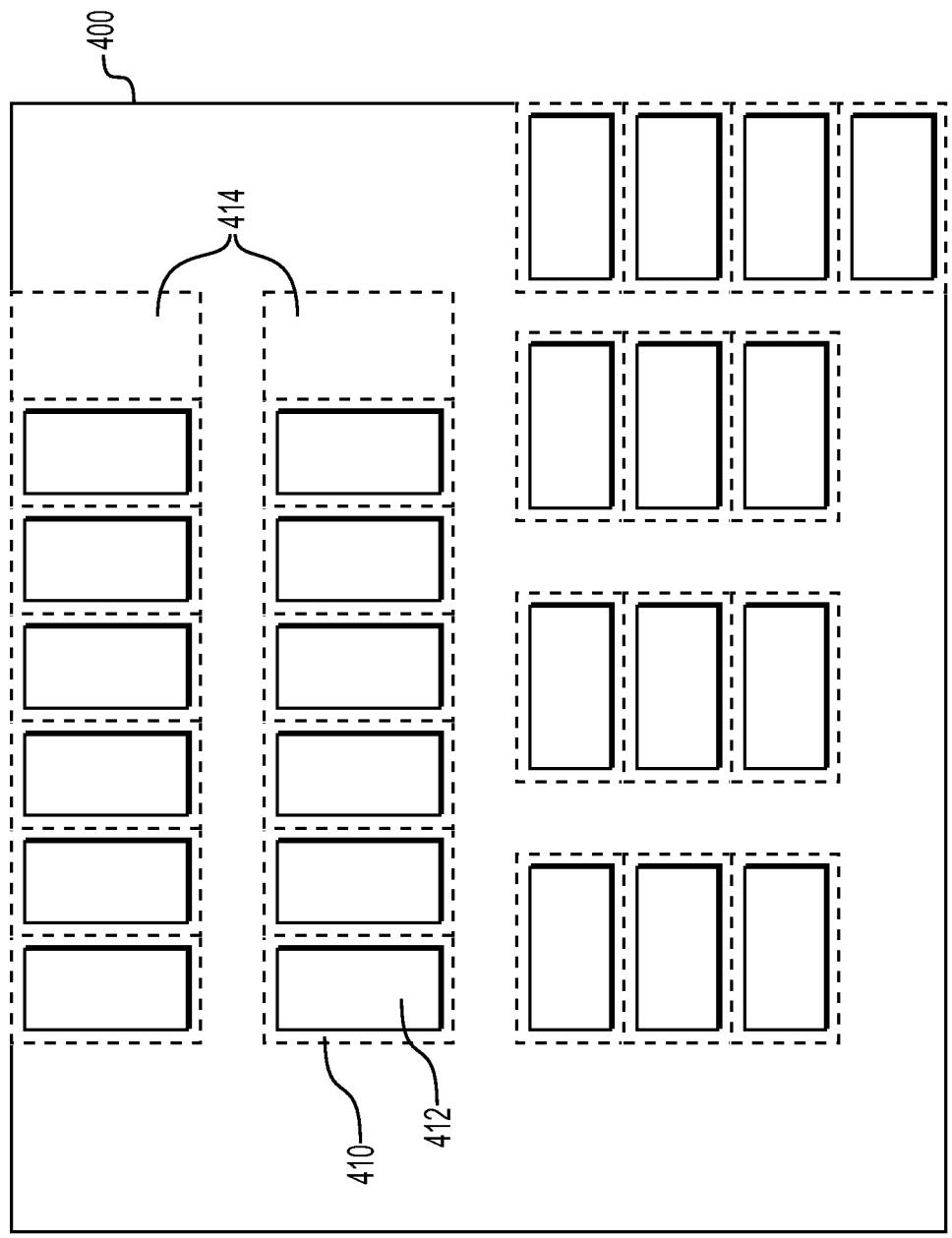

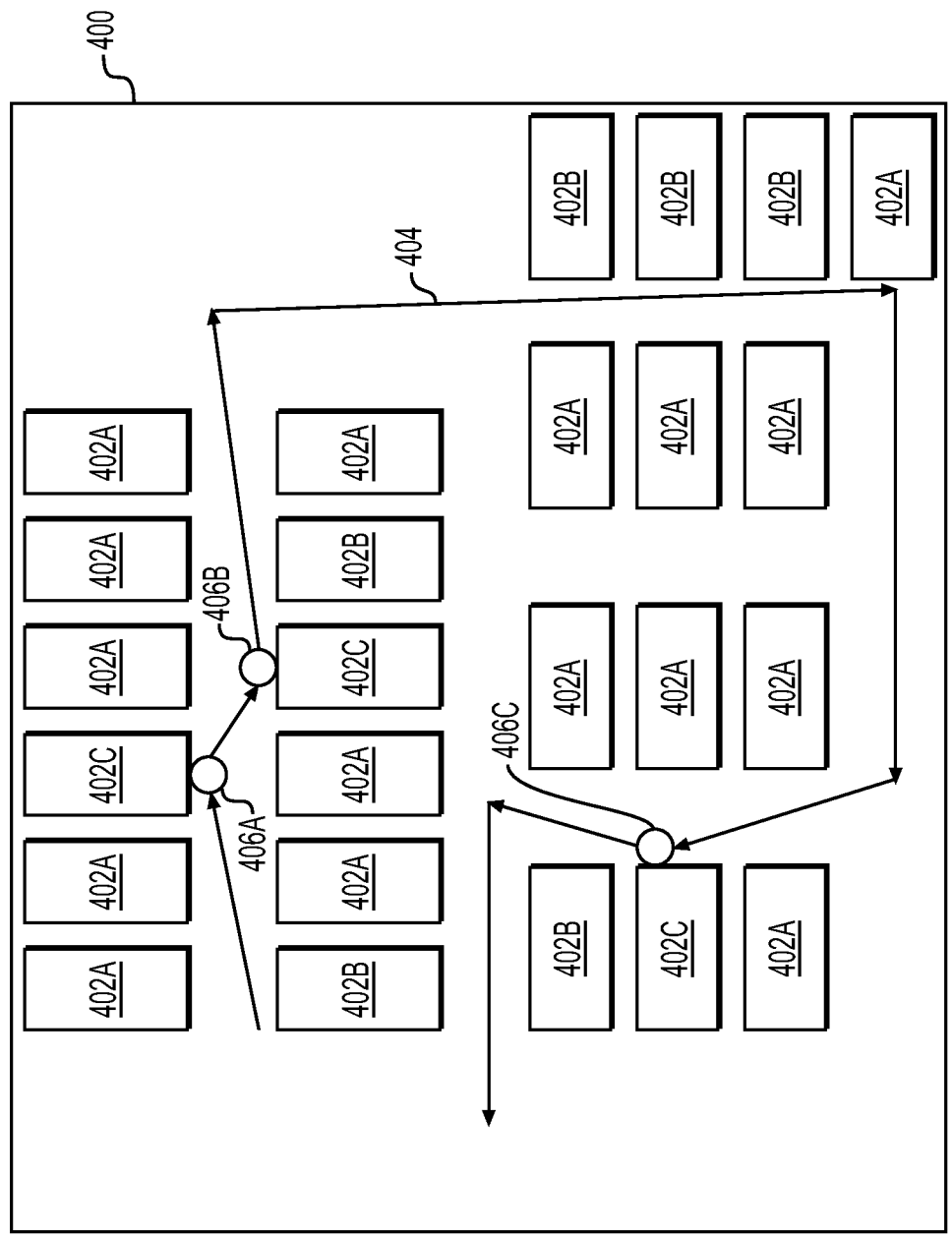

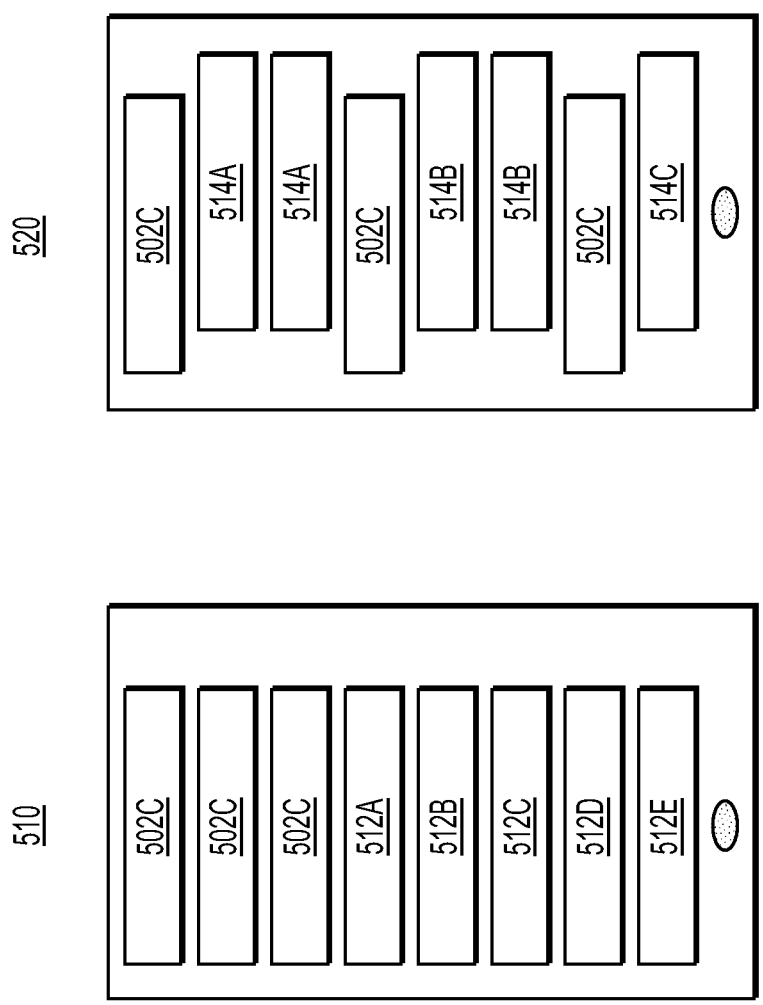

USER-BASED VEHICLE DETERMINATION

CROSS-REFERENCE TO RELATED APPLICATION(S)

This patent application is a continuation of and claims the benefit of priority to U.S. Nonprovisional patent application Ser. No. 17/662,133, filed on May 5, 2022, which is a continuation of U.S. Nonprovisional patent application Ser. No. 17/246,990, filed on May 3, 2021, now U.S. Pat. No. 11,354,524, all of which are incorporated by reference herein in their entireties.

TECHNICAL FIELD

Various embodiments of the present disclosure relate generally to providing vehicle profiles to a user device, and more particularly, to systems and methods for identifying user interactions with physical objects and providing profiles based on the same.

BACKGROUND

Traditional shopping, such as vehicle shopping, may involve a user shopping online (e.g., via a website, marketplace, etc.) or in person (e.g., at a shop, a store, a dealership, etc.). However, often, a user is not easily able to shop online for an item that the user identified in person or expressed interest in when seeing the item in person. Additionally, online databases can provide users with a plethora of information about items that are difficult to physically locate in person. Users often have to search online to find the exact object (e.g., vehicle) that the user may have viewed, interacted with, or otherwise was interested in when interacting with the object in person. Such finding of the exact object can be time consuming and may deter a user from purchasing the product as a result.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems for generating vehicle profiles are disclosed. The methods and systems may include scanning a plurality of vehicles, each vehicle located at a respective vehicle location, identifying respective vehicle locations for each of the plurality of vehicles, based on scanning the plurality of vehicles, associating a vehicle identification tag for each vehicle with its respective vehicle location, interpreting a signal to determine a user location, determining that the user location is within a threshold distance from a first vehicle location of a first vehicle from the plurality of vehicles, providing a first vehicle identification tag corresponding to the first vehicle based on determining that the user location is within the threshold distance, generating a first vehicle profile based on the first vehicle identification tag, and providing the first vehicle profile to a user device.

In another aspect, an exemplary embodiment of a computer-implemented system for generating object profiles may include a communication device, a memory storing instructions, one or more processors configured to execute the instructions to perform operations, a publicly available location engine, and a local location engine. The publicly available location engine may be configured to cause the one or more processors to: identify respective object locations for each of a plurality of objects, based on scanning the plurality of objects, associate an object identification tag for each object with its respective object location. The local location engine may be configured to cause the one or more processors to: receive the respective object locations for each of the plurality of objects, interpret a signal to determine a user location, determine that the user location is within a threshold distance from a first object location of a first object from the plurality of objects, receive a first object identification tag corresponding to the first object based on determining that the user location is within the threshold distance, receive a first object profile based on the first object identification tag, and provide the first object profile via a user device.

In another aspect, a method for generating object profiles may include scanning a plurality of objects, each object located at a respective object location, identifying respective object locations for each of the plurality of objects, based on scanning the plurality of objects, associating respective object identification tags for each object with its respective object location, interpreting a plurality of signals to determine a plurality of user locations over a period of time, determining that at least a subset of the plurality of user locations are within a threshold distance from a subset of the respective object locations for the plurality of objects, providing respective object identification tags corresponding to the subset of subset of the object locations, generating a set of respective object profiles for each of the respective identification tags corresponding to the subset of the object locations, and providing the set of respective object profiles in a ranked order via a user device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4A depicts an exemplary diagram for identifying vehicle locations, according to one or more embodiments.

FIG. 4B depicts an exemplary diagram of user behavior near vehicles, according to one or more embodiments.

FIG. 5B depicts another exemplary visualization of vehicle profiles, according to one or more embodiments.

FIG. 5C depicts another exemplary visualization of vehicle profiles, according to one or more embodiments.

Like reference numbers and designations in the various drawings indicate like elements.

DETAILED DESCRIPTION OF EMBODIMENTS

Figure 1A:
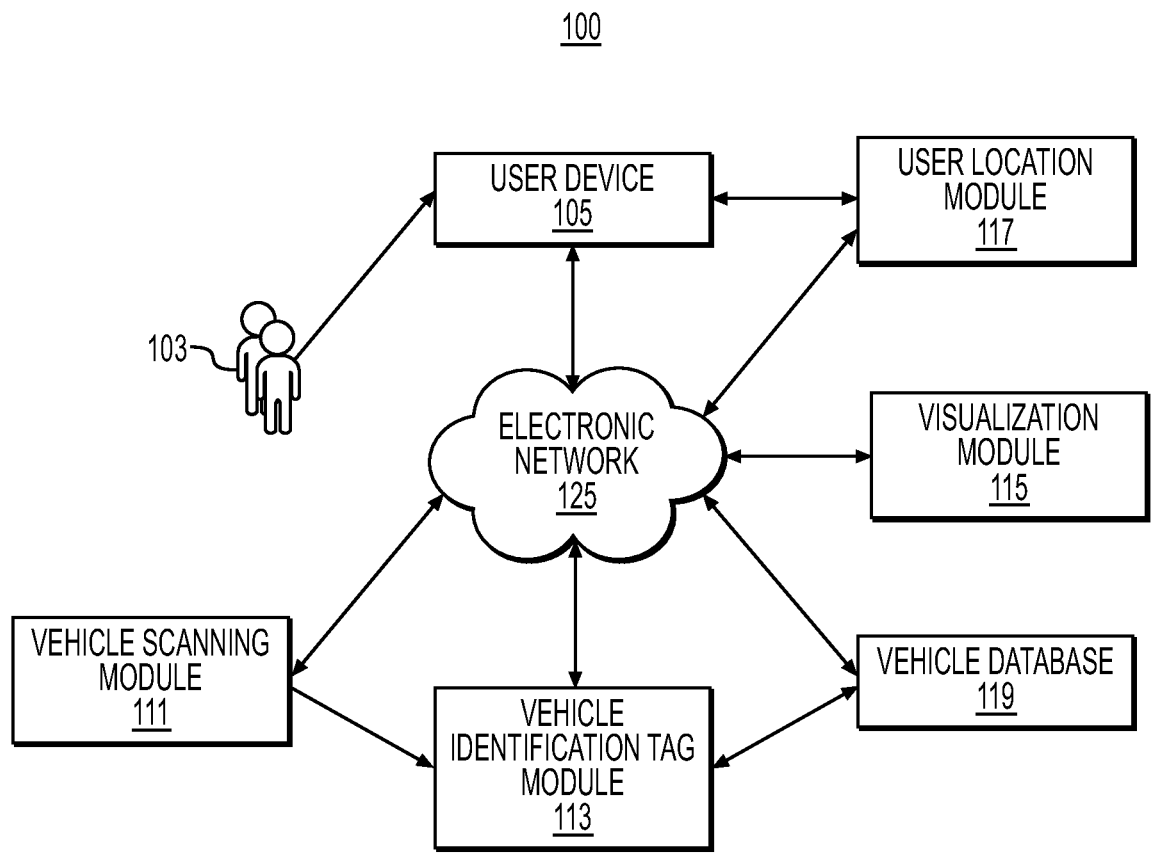
FIG. 1A depicts an exemplary computing environment for providing vehicle profiles, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

As used herein, a "vehicle" may refer to a car, truck, bus, a bicycle, a motorcycle, a boat, a plane, a recreational vehicle, a three-wheeler, a hybrid, a crossover, a sports-utility vehicle (SUV), or the like. Vehicle attributes may include vehicle type (e.g., sedan, convertible, SUV, crossover, coupe, etc.), vehicle color, vehicle rating, vehicle reliability, vehicle cost, vehicle age, vehicle location, vehicle information available, vehicle condition, vehicle history, vehicle mileage, vehicle make, vehicle model, vehicle drive type, vehicle fuel type, vehicle transmission, number or type of cylinders, vehicle features, seller information, or the like.

As used herein, a "vehicle location" may refer to the location at which a vehicle is currently located or at which the vehicle was located in the past. The vehicle location may correspond to a space-specific designation (e.g., a parking spot number in a parking lot), a coordinate (e.g., a latitude and/or longitude), a three dimensional location (e.g., in a stacked parking lot), an address, or the like.

As used herein, a "user location" may be the location of a given user independent of one or more vehicles or relative to one or more vehicles. The user location may include, or may have a corresponding distance from one or more vehicles. The user location may be a single location or may correspond to multiple locations over a span of time (e.g., a track). For example, a user location may include the closest distance between the user and a first vehicle within a span of time and may also include a closest distance between the user and a second vehicle within the span of time.

Although the subject matter disclosed herein is directed to a vehicle, it will be understood that any object may be substituted for a vehicle and the techniques, systems, and/or devices disclosed herein may be applied to any such object.

According to implementations of the disclosed subject matter, a user may view one or more vehicles in person (e.g., during a visit to a dealership.) During the visit, the user may prefer one or more vehicles more than other vehicles or may want information about all vehicles that the user saw. Techniques disclosed herein may enable a user to retrieve, via a user device (e.g., the user's cellular phone), vehicle profiles about the vehicles that the user saw in person. The vehicle profiles provided to the user may be based on the vehicles that the user saw and/or preferred during the in person visit. Providing the vehicle profiles may enable a user to more easily review their preferred vehicles, identify additional information about the preferred vehicles, and improve an overall vehicle shopping or renting experience for the user.

According to implementations of the disclosed subject matter, a plurality of vehicles, each located at a respective vehicle location, may be scanned. The scanning may be conducted in any applicable manner, such as those disclosed herein. The scanning may also be a manual step where the location of the plurality of vehicles is input by a user. The scanning may include retrieving information from a vehicle log that includes the locations of the plurality of vehicles. Respective vehicle locations for each of the plurality of vehicles may be identified based on scanning the plurality of vehicles. The respective vehicle locations may be specific to a spot (e.g., a numbered spot in a parking lot) or may be based on a coordinate system (e.g., latitude, longitude, Geographical Positioning System (GPS) coordinates, grid coordinates, etc.) According to an implementation, each spot that each of the plurality of vehicles occupy may be analyzed by a sensing mechanism, and based on the analysis a local coordinate system may be generated to then assign vehicle locations to each respective vehicle. The local coordinate system may be determined by using a machine learning model configured to generate an optimal local coordinate system for vehicle location identification and/or user location identification and the local coordinate system may subsequently be used to identify vehicle locations and/or user locations. For example, data related to a given space (e.g., parking lot) may be provided to a machine learning model and the machine learning model may identify potential vehicle locations (e.g. parking spots) based on analyzing the data related to the given space. The machine learning model may be supervised such that it is trained based on training data that incorporates previous coordinate systems and their corresponding results (e.g., previously determined vehicle locations) and may further be optimized over time based on such information.

A vehicle identification tag for each vehicle may be associated with its respective vehicle location. The vehicle identification tag may be a designation that distinguishes one vehicle from another vehicle. The vehicle identification tag may be a digital alphanumeric tag, a signal (e.g., a beacon, a radio-frequency identification (RFID) signal, near field communication (NFC) signal, a Bluetooth® signal, triangulation signal, a scan signal, etc.), a model number, a vehicle identification number (VIN), or any other applicable tag. Information, such as vehicle attributes, about the respective vehicle may be associated with the vehicle identification tag. The association may be included in the vehicle information tag itself or may be obtained using the tag. For example, a vehicle information tag may allow a vehicle database to identify a specific vehicle. According to another example, the vehicle information tag may be formatted such that it includes all the vehicle information. According to this example, the vehicle identification tag may be a signal including a header and a body, where the header and the body include vehicle identification information and vehicle attributes.

A signal may be interpreted to determine a user location. The signal may be a location (e.g., GPS) signal emitted from a user device such as a mobile phone, wearable device, a sensor, or the like. The signal may be based on one or more beacons or other sensors that is generated when a user or user device is in proximity to the beacon. The signal may be generated based on a proximity sensor or scanning sensor that identifies the user and the user's location and generates a corresponding signal. The signal may be generated based on a combination of two or more factors such as a mobile device's GPS coordinates and a beacon activated based on the proximity of the user device. A determination may be made that the user location is within a threshold distance from the vehicle location of a vehicle. The threshold distance may be a distance within which a user may observe the vehicle, observe a vehicle sticker, or the like.

Figure 1B:
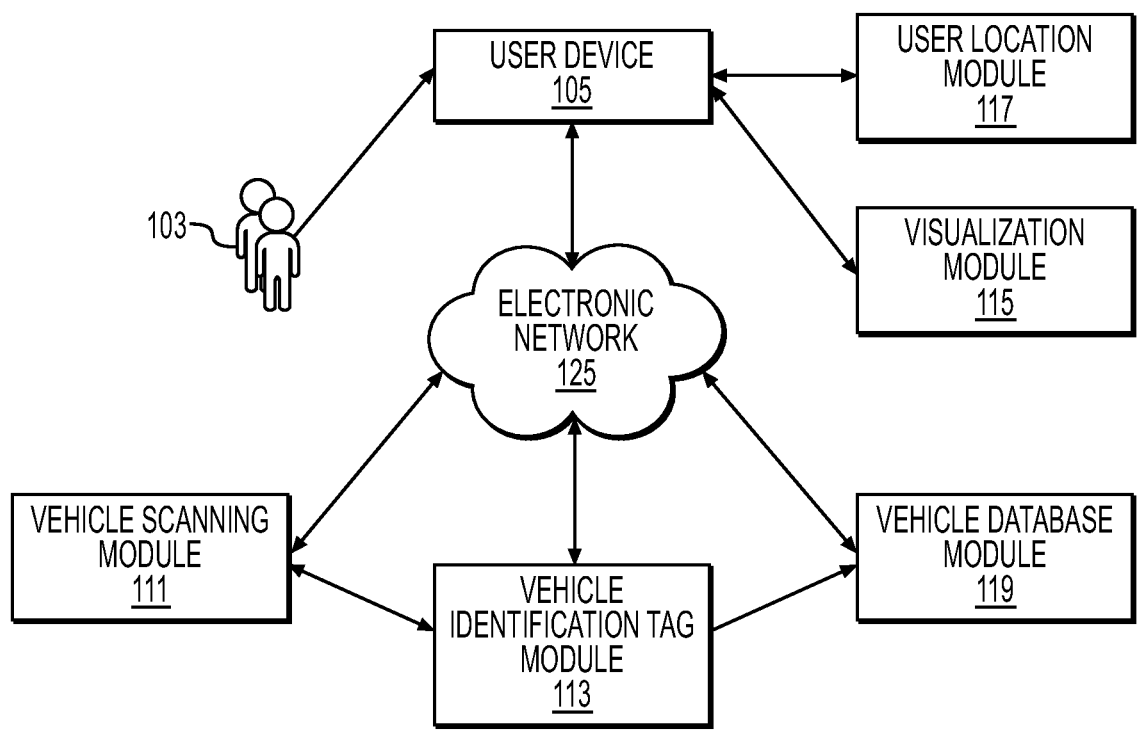
FIG. 1B depicts another exemplary computing environment for providing vehicle profiles, according to one or more embodiments.

If the user location is within the threshold distance from a vehicle, then a vehicle identification tag associated with the vehicle may be provided to a system component. The system component may be a network connection or local component. For example, a server may correlate a vehicle location with user locations and provide the vehicle identification tag of a vehicle that has a vehicle location proximate to a user location. The vehicle identification tags for vehicles that have a location that match with a user location may be provided to a component via an electronic network, as shown in FIG. 1A. Alternatively, the vehicle identification tag may be transmitted to a user device that may utilize the tag to retrieve information for the vehicle associated with the vehicle identification tag from an electronic network, as shown in FIG. 1B herein.

A vehicle profile may be generated based on a vehicle tag and may include some or all of the available vehicle attributes. The vehicle profile may be provided to the user via a user device.

Implementations disclosed herein provide a number of technical aspects including reduction in resources used, reduction in storage requirements, faster processing, or the like. For example, by limiting the number of vehicles to provide to a user (e.g., a user looking to purchase a vehicle) based on the vehicles that the user has viewed in person, the number of possible vehicles to render and provide to the user via a user device may be reduced. Additionally, a user may be provided more relevant vehicle options based on the user's affinity to one or more vehicles that the user has viewed in person, as further disclosed herein.

FIG. 1A depicts an exemplary computing environment 100 that may be utilized with techniques presented herein. In some embodiments, the computing environment 100 may be, may include, and/or may form a portion of a vehicle profile system. FIG. 1A includes one or more user device(s) 105 associated with one or more users 103, a vehicle scanning module 111, a vehicle identification tag module 113, a vehicle database, 119, a user location module 117, and visualization module 115 that may be part of the computing environment 100. Some or all of the components shown in computing environment 100 may communicate across an electronic network 125. Each user device 105 may be associated with a respective user 103 or multiple persons may use the same device 105.

The vehicle scanning module 111 may be configured to scan one or more vehicles in a given space. The space may be a contiguous space or may be non-contiguous. The space may be a multi-dimensional space such as a parking structure. The vehicle scanning module 111 may scan for vehicles such that it may determine whether a vehicle is or is not in a vehicle location. The vehicle locations may be based on a space coordinate, may be a global coordinate system (e.g., latitude and longitude), or may be generated by the vehicle scanning module 111 for the given space. The determination whether a vehicle is at a vehicle location may be made based on detecting the physical presence of a vehicle via a signal generated to indicate the physical presence, receiving a signal emitted from the vehicle or a component associated with the vehicle (e.g., an RFID tag), receiving a reflection or confirmation of a transmitted signal, or the like. According to an implementation, a manual input of a vehicle being at a vehicle location may be input into the vehicle scanning module 111.

A vehicle identification tag may be on a vehicle, transmitted by a vehicle, may be identified as being associated with a vehicle, or may be generated for a vehicle. An example of a vehicle identification tag on a vehicle may be a VIN number or other code that is scanned. An example of a vehicle identification tag being transmitted by a vehicle may be a vehicle having an RFID or NFC tag that is powered by a user device and transmits a signal including a vehicle identification tag when the user device is in close proximity to the vehicle. An example of a vehicle identification tag being identified as being associated with a vehicle may be shown by using a scanner to scan vehicle attributes (e.g., size, color, features) and identifying a vehicle identification tag from a group of available vehicle identification tags, based on the scanned information. An example of a vehicle identification tag being generated for a vehicle may be shown by using a scanner to scan vehicle attributes (e.g., size, color, features) and generating a vehicle identification tag based on the scanned information.

A vehicle identification tag may be associated with the vehicle by the vehicle scanning module 111. For example, the vehicle scanning module may identify a vehicle at a vehicle location and may designate that vehicle as being associated with a corresponding vehicle identification tag. The vehicle scanning module 111 may associate a vehicle with the corresponding vehicle identification tag by identifying the features of the vehicle to correlate them with a vehicle identification tag, by receiving and/or triggering a signal (e.g., an RFID signal) that identifies the vehicle identification tag, by scanning a code (e.g., a QR code, barcode, other image or video, VIN number, etc.) to identify the vehicle identification tag, and/or the like. Alternatively, the vehicle identification tag may be associated with the vehicle via a user device or other component other than the vehicle scanning module 111.

A vehicle identification tag module 113 may generate and/or provide vehicle information tags to one or more of a vehicle scanning module 111, vehicle database 119, visualization module 115, and/or user device 105. According to an implementation, the vehicle identification tag module 113 may generate a vehicle identification tag for a vehicle scanned by the vehicle scanning module 111. The vehicle identification tag module 113 may generate the vehicle identification tag based on properties of the vehicle scanned by the vehicle scanning module. The generated vehicle identification tag may be used to populate a vehicle profile at a user device, as further disclosed herein. According to an implementation, the vehicle identification tag module 113 may store previously generated vehicle identification tags for one or more vehicles. The vehicle identification tag module 113 may provide the vehicle identification tag for a given vehicle when that vehicle is scanned by the vehicle scanning module 111.

Visualization module 115 may generate an interface that provides one or more vehicle profiles to a user. The visualization module 115 may determine the optimal manner in which to provide the one or more vehicle profiles based on, for example, the type of user device 105, capabilities of the user device 105, user device 105 settings, orientation of user device 105, user preference, or the like, or a combination thereof.

A vehicle database 119 may include vehicle information tags, vehicle attributes, vehicle availability, vehicle locations, or the like. The vehicle scanning module 111 may communicate with the vehicle database 119 to match one or more scanned vehicles with their corresponding vehicle information tags. Alternatively, or in addition, the vehicle scanning module 111 may retrieve vehicle information from the vehicle database 119. Alternatively, or in addition, the visualization module 115 may receive vehicle tag information and may access the vehicle database 119 to retrieve vehicle information based on the vehicle tag information. Alternatively, or in addition, a user device 105 may access the vehicle database 119 to retrieve vehicle information.

The systems and devices of the computing environment 100 may communicate in any arrangement. As will be discussed herein, systems and/or devices of the computing environment 100 may communicate in order to generate vehicle profiles and/or to generate graphical interfaces based on vehicle locations, user locations, and/or vehicle identification tags.

The user device 105 may include a computer system such as, for example, a mobile device, a tablet, a laptop, a wearable device such as a smart watch, smart glasses, etc. In an exemplary embodiment, a user device 105 is a telephone, e.g., a mobile phone, or the like. In some embodiments, the user device 105 may include one or more electronic application(s) (e.g., a program, plugin, etc.), installed on a memory of the user device 105. Such electronic applications may include a distance point tracker, travel planner, location viewer, or the like. In some embodiments, the electronic application(s) may be associated with one or more of the other components in the computing environment 100. For example, the electronic application(s) may include a portal for accessing and/or interacting with one or more of the other components in the computing environment 100.

The user location module 117 may be a part of a user device 105 or may be independent from user device 105. For example, a GPS transceiver at the user device 105 may be at least a part of the user location module 117. The user location module 117 may be activated whenever the user device 105 is powered or may be activated based on a proximity of the user device 105 to one or more vehicles. The user location module 117 may identify, determine, and/or record a location of a user 103. According to an implementation, the user location module 117 may determine a location of a user 103 relative to one or more vehicles.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a world-wide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1A, it should be understood that a component or portion of a component may, in some embodiments, be integrated with or incorporated into one or more other components. For example, the user location module 117 and visualization module 115 may be part of the user device 105 or software or a component associated with user device 105 (e.g., an application). The vehicle scanning module 111, vehicle identification tag module 113 and/or vehicle database 119 may be part of the same component or may all be implemented within the electronic network 125. Further, it should be understood that data described as stored on a memory of a particular system or device in some embodiments, may be stored in another memory or distributed over a plurality of memories of one or more systems and/or devices in other embodiments. Additionally, or alternatively, some or all of the components of FIG. 1A may be part of the same entity that may receive data from one or more components (e.g., user device 105 via electronic network 125) and may transmit data to one or more components. The entity may physically house these components in the same or different locations or may access these components via a cloud-based connection or cloud server (e.g., via electronic network 125).

In the implementations described herein, various acts are described as performed or executed by components from FIG. 1A. However, it should be understood that in various implementations, various components of the computing environment 100 discussed above may execute instructions or perform acts including the acts discussed herein and that any act attributed to a particular component herein need not necessarily be performed by that particular component. Further, it should be understood that in various implementations, one or more steps may be added, omitted, and/or rearranged in any suitable manner.

FIG. 1B shows computing environment 102 that includes the same components as shown in FIG. 1A. The components shown in FIG. 1A are arranged such that the user location module 117 is in communication with both the user device 105 as well as the electronic network 125. The connection to electronic network 125 can enable the vehicle sensing module 111, vehicle identification tag module 113, and/or the vehicle database 119 to use the user location module 117 and/or a user location determined by the user location module 117. However, for security and/or privacy considerations, it may be beneficial to limit the access to the user location module 117 and/or the user location determined by the user location module 117. Accordingly, as shown in FIG. 1B, the components disclosed herein may be arranged such that the user location module 117 is only in communication with the user device 105. As such, the user device 105 may receive the vehicle location information from the vehicle scanning module 111 and may use the vehicle location information with the user location information from the user location module 117 to determine relationships between the user locations and the vehicle locations.

As shown in FIG. 1B, a publicly available location engine may correspond to the components other than the user device 105 that are connected to the electronic network 125. In the configuration shown in FIG. 1B, a user location is unknown to the publicly available location engine. A local location engine may correspond to the user device 105 and any components that are part of the user device 105 that do not communicate with the electronic network 125 and/or any components external to the user device 105 that communicate with the user device 105 but not the electronic network 125. Although electronic network 125 is specifically noted herein, it will be understood that components in the local location engine may be secluded from external communication via any network connection.

Figure 2:
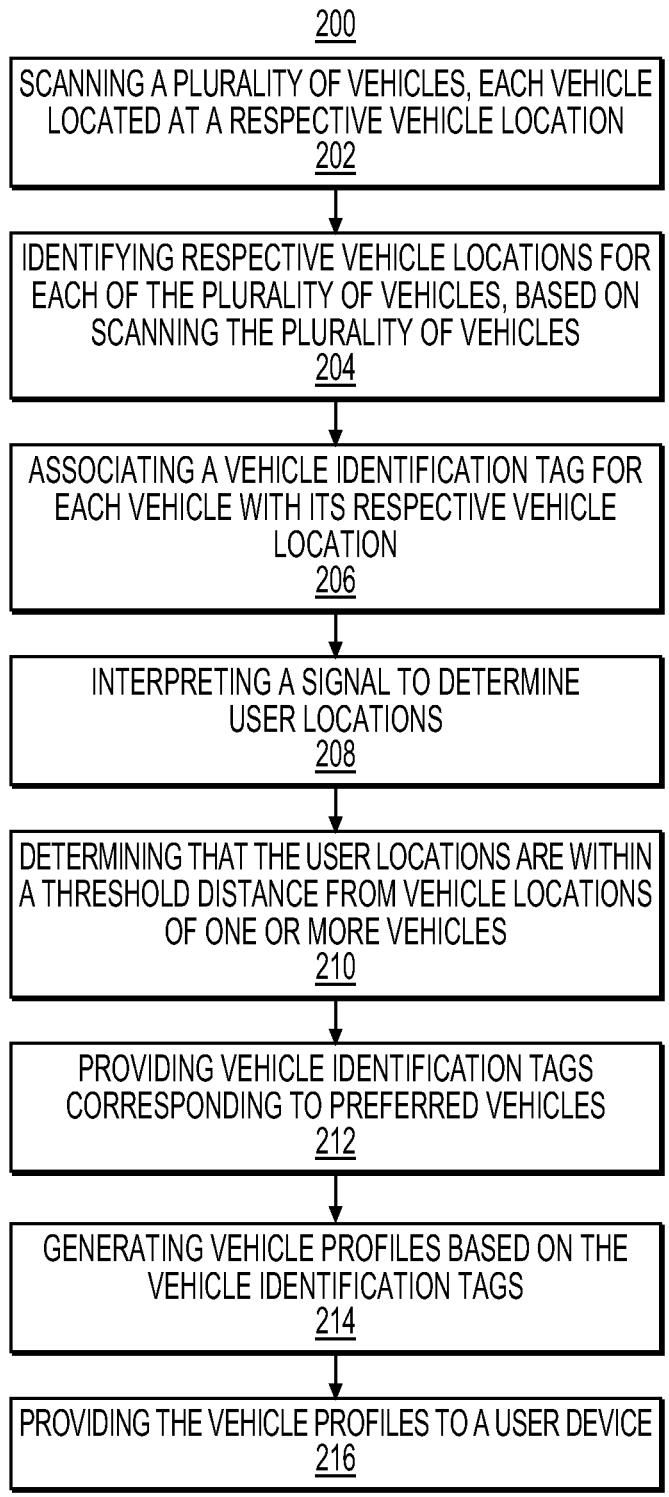
FIG. 2 depicts a flowchart of an exemplary method for providing vehicle profiles, according to one or more embodiments.

FIG. 2 illustrates an exemplary process 200 for providing vehicle profiles to a user device 105. Some or all of the stages shown in FIG. 2 may be implemented using a machine learning model. Such a machine learning model may be trained according to a process as described hereinafter with reference to FIG. 3. At 202 of FIG. 2, a plurality of vehicles, each located at a respective vehicle location, may be scanned via vehicle scanning module 111. The vehicles may be scanned in any applicable manner that identifies the plurality of vehicles as being at their respective vehicle locations and/or associates vehicle information tags with each vehicle, as further discussed herein at 206. The vehicles may be scanned periodically (e.g., once per day), may be scanned when a change in vehicle positions is triggered (e.g., if a vehicles is detected as moving from one location to any other location), or may be scanned upon receiving an input (e.g., from an operator).

According to an implementation, the vehicles may be scanned. A scan may involve a camera, infra-red, radar, and/or other sensor to detect the presence of each respective vehicle. A vehicle scanning module 111 with a sensor may be able to view each of the plurality of potential vehicle locations at once or the sensor may be able to traverse a distance to view each of the plurality of potential vehicle locations. According to an implementation, the sensor may be part of an unmanned aerial vehicle (e.g., a drone) that views potential vehicle locations from an aerial view.

According to another implementation, scanning the vehicles may involve detecting signals that emit the location of each of the plurality of vehicles. The signals may be emitted by each vehicle such that the vehicle scanning module 111 is able to determine the vehicle location of a vehicle based on the signals emitted from the respective vehicle. As further discussed in relation to 206, the signals emitted by the vehicles may include the corresponding vehicle identification tag for each respective vehicle. The vehicles may emit the signals at a plurality of times (e.g., periodically at a given frequency) such that a vehicle scanning module 111 receives signals from each of the plurality of vehicles over a time period. Alternatively, the vehicles may emit the signals based on a trigger condition. The trigger condition may be a signal emitted by a component of the vehicle scanning module 111 or other device. The trigger condition may also be a signal providing energy to a vehicle component such that the energy activates the vehicle component to emit a signal identifying the vehicle and/or its location. For example, an RFID or NFC signal may be emitted by a component of the vehicle scanning module 111 and may be received by a corresponding RFID or NFC chip located at the vehicle. The RFID or NFC chip located at the vehicle may be energized based on the RFID or NFC signal and may, as a result, generate a responsive RFID or NFC signal that is received by a component of the vehicle scanning module 111.

According to an implementation, the vehicles may be cataloged based on a manual input of vehicles at their respective vehicle locations. The manual input may designate a vehicle location as being occupied by a vehicle or as being un-occupied by a vehicle.

At 204 of FIG. 2, the respective vehicle locations for each of the plurality of vehicles may be identified based on scanning the plurality of vehicles. The vehicle locations may be subsets of areas within an overall space (e.g., parking spots within a lot), may be coordinates, or may be any other applicable location designation for each respective vehicle. For example, at 204, each potential vehicle location may be designated as having a vehicle or not having a vehicle. The potential vehicle locations designated as having a vehicle may be identified as such.

FIG. 4A shows an example space 400 with a plurality of vehicle locations. At 202 of FIG. 2, a plurality of vehicles 412 each having a vehicle location 410 may be scanned. At 204, the vehicle scanning module 111 may identify the vehicle locations 410 that include vehicles 412 and may identify vehicle locations 414 that do not include a vehicle 412. Accordingly, a given spot in a space 400 may be categorized as a vehicle location 410 with a vehicle or a vehicle location 414 without a vehicle.

At 206 of FIG. 2, a vehicle identification tag for each vehicle may be associated with its respective vehicle location. According to an implementation, the vehicle identification tag module 113 may receive a respective vehicle identification tag directly from each vehicle. The vehicle identification tag module 113 may receive a signal from each respective vehicle and that signal may include the vehicle identification tag for that vehicle. Alternatively, the vehicle identification tag module 113 may receive an indication signal from each vehicle in a vehicle location. The indication signal may include an identifier that is provided to a database (e.g., vehicle database 119) by the vehicle identification tag module 113. The vehicle identification tag module 113 may then receive the vehicle identification tag from the database (e.g., vehicle database 119) based on the indication signal. The vehicle identification tag module 113 and/or the vehicle scanning module 111 may associate the vehicle identification tag for a given vehicle with the vehicle location of that vehicle, as identified at 204. The association may be stored locally or at a remote database via electronic network 125.

According to an implementation, vehicle identification tag module 113 may identify a vehicle identification tag based on a scanned vehicle. The vehicle identification tag module 113 may identify a code (e.g., a VIN number, QR code, etc.) associated with each vehicle and may generate or obtain a respective vehicle identification tag based on the code. Alternatively, the vehicle identification tag module 113 may generate or obtain a vehicle identification tag based on vehicle scans provided by the vehicle scanning module 111. For example, the vehicle scanning module 111 may scan a vehicle and obtain sufficient details for the vehicle identification tag module 113 to identify vehicle attributes associated with the vehicle. The vehicle identification tag module 113 may then generate a vehicle tag, obtain a vehicle tag (e.g., via vehicle database 119), or the like, based on the vehicle properties.

As described herein, the vehicle identification tag may enable generation of a vehicle profile, as further disclosed herein in relation to 214. The vehicle identification tag may allow a system to provide vehicle-specific information such that a user that views a vehicle, in person at a given vehicle location (e.g., during a dealership visit) may then access information corresponding to the same exact vehicle online (e.g., via user device 105).

At 208 of FIG. 2, a signal may be interpreted to determine a user location using a user location module 117. The signal may be generated by a user device 105. The signal may be any applicable signal for determining a user location and may be a GPS signal, a nearfield signal, a Bluetooth® signal, a triangulation signal, a beacon signal, a scan signal, or an RFID signal. The user device 105 that emits the signal may be a mobile phone belonging to a user 103 or may be a different mobile device such as a wearable device, an activity-specific device, or the like. An activity-specific device may be a device that is provided to the user 103 specifically for carrying while the user observes the plurality of vehicles. The user 103 may receive such a device, for example, at a car dealership and may then proceed to a car parking lot or garage while keeping the device at or near the user 103's body.

The signal interpreted to determine the user location may be generated by an external device such as a camera, motion sensor, radar detector, heat sensor, or other suitable device for identifying the location of a given user. The external device may be configured to identify and/or distinguish a user from other individuals based on user features such as physical features, signals emitted from a device carried by or near other individuals, initial tags (e.g., identifying a user when the user enters a given space) that enable the external device to track a user, or the like.

The user location module 117 may store the user 103's locations over time while the user is within an area that corresponds to potential vehicle locations (e.g., a parking lot.) According to an implementation, the user 103's locations may be captured and/or stored until associations between the user 103's locations and the vehicle locations are made at 210 of FIG. 2. The user 103's locations may be removed and/or deleted thereafter to preserve the user 103's privacy.

As shown in FIG. 1A, the user location module 117 may be connected to vehicle scanning module 111 via electronic network 125. According to this implementation, the user 103's locations may be compared to the vehicle locations determined by the vehicle scanning module 111 or another component accessible via electronic network 125. Alternatively, as shown in FIG. 1B, the user location module 117 may be isolated from the electronic network 125 such that only the user device 105 has access to the user 103's locations, as determined by the user location module 117. According to this implementation, the user device 105 may receive the vehicle locations from the vehicle scanning module 111 via electronic network 125 and the user 103's locations may be compared to the vehicle locations by the user device 105.

At 210 of FIG. 2, determinations that the user locations are within a threshold distance from one or more of the plurality of vehicles may be made. The determinations may be based on comparing the user locations to the vehicle locations to determine the proximity of the user 103 to the one or more vehicles. For example, each vehicle location may be a boundary of the vehicle or point (e.g., center point) of the vehicle. A calculation may be made by comparing a point on the user's path (i.e., a path determined based on the user's locations over a period of time) that is closest to a vehicle location to determine the proximity of the user 103 to the respective vehicle.

The threshold distance may be predetermined, manually adjusted, or dynamically determined. A predetermined threshold distance may be a default distance (e.g., 3 feet). A manually adjusted threshold distance may be provided by adjusting the predetermined threshold distance or by establishing a new threshold distance. The manual adjustment may be made by an operator (e.g., a car dealer) and may be made using an applicable software. A dynamically determined threshold distance may be based on the proximity of the user to all or a subset of vehicles in a given space. The dynamically determined threshold distance may identify a number or percentage of vehicles from the total plurality of vehicles that the user 103 was most proximate to. For example, the system may be configured to identify 15% of vehicles to which a user 103 was closest. Accordingly, the dynamically determined threshold distance may correspond to a maximum distance between user 103 and the 15% of identified vehicles. As a more specific example, if a user walks around a parking lot of 100 cars at various distances between each car, the top 15 cars that the user is closest to may be identified. In this example, the dynamically determined threshold distance corresponds to a distance between the user 103 and a car of the top 15 cars from which the user is furthest, as that distance would be the greatest distance between the user 103 and any of the top 15% of cars to which the user is closest.

FIG. 4B provides the example space 400 of FIG. 4A and shows a user tracker 404 based on the user locations of a user 103. As shown in FIG. 4B, the user 103 travels to and is proximate to vehicles 402C, travels near vehicles 402B (i.e., close but not within a threshold distance), and spends a duration of time greater than a predetermined duration at tracked points 406A, 406B, and 406C. The vehicles 402A correspond to vehicles that the user locations are not proximate to. The vehicles 402C correspond to vehicles from which the user 103's location is within a threshold distance. As shown, the user tracker 404 indicates that user 103 was in close proximity to each of the vehicles 402C. Additionally, the user 103 spent at least a predetermined duration at each of the vehicles 402C, as indicated by the tracked points 406A, 406B and 406C. The duration of time corresponding to each respective tracked point 406A, 406B, and 406C may be used to determine a vehicle affinity score for each of the respective vehicles, as further disclosed herein. As also disclosed herein, vehicle profiles may be generated for the vehicles 402C based on the user 103's proximity to each of these vehicles. According to an implementation, if a number of vehicles 402C is deemed insufficient, subsequent vehicle profiles corresponding to vehicles 402B that the user 103 travels near may also be provided to user 103.

One or more vehicles may be identified based on the determinations that the user locations are within a threshold distance from the one or more vehicles (e.g., vehicles 402C of FIG. 4B). These vehicles may be considered user-favored vehicles based on the user 103's proximity to the vehicles. According to an implementation, a vehicle affinity score may be determined to identify the degree of interest that a user 103 has for one or more vehicles such that the user-favored vehicles may be filtered based on the vehicle affinity scores for the plurality of vehicles. The vehicle affinity scores may be calculated for all potential vehicles or may be calculated only for vehicles that are within a threshold distance of the user 103's locations. By limiting the vehicle affinity scores to those vehicles that are within the threshold distance, the total number of vehicle profiles provided to the user may be reduced. According to an implementation, the determination of whether to apply affinity scores to all the vehicles, only to vehicles that are within the threshold distance of the user 103's locations, or another subset of vehicles may be made based on a number of vehicles that are within the threshold distance of the user 103's locations. For example, if the user 103, while traversing a space (e.g., parking lot) is only proximate to two vehicles, then the affinity score may be calculated for all vehicles. Additionally, if the user 103 is proximate to twenty vehicles, then the affinity score may be calculated for the twenty vehicles as this may provide the user 103 with sufficient vehicle profiles. No affinity score may be calculated for the vehicles that the user 103 is not proximate to. According to an implementation, vehicle profiles may be provided to the user 103 if the corresponding affinity score for a given vehicle profile exceeds an affinity score threshold.

According to an implementation, the vehicle affinity score for any given vehicle may be calculated based on the duration of time that the user 103 is within the threshold distance from a respective vehicle location. The duration of time may be the amount of uninterrupted time that the user is within the threshold distance from the given vehicle or may be based on any groups of times that the user is within the threshold distance. As an example, a user 103 may be within a threshold distance from a given vehicle three different times (e.g., the user 103 may leave and come back to the given vehicle twice.) The user may be within the threshold distance for 15 seconds a first time, 120 seconds a second time, and 45 seconds a third time. According to this example, the duration of time that the user 103 is within the threshold distance from the given vehicle is 180 seconds. The affinity score for a given vehicle may be based on the duration of time that a user 103 is within the threshold distance from a given vehicle such that the greater the duration of time, the higher the affinity score may be.

According to an implementation, the vehicle affinity score for any given vehicle may be calculated based on a user input via a user device 105 or a vehicle component. The user input may be provided via user device 105, an activity-specific device, or the like. The input may be any applicable input such as, but not limited to, capturing a photograph, capturing a video, initiating a search, adding a note, indicating an interest, or the like. The user may provide access for calculation of the affinity score based on user input via a prompt (e.g., an application pop-up) or settings menu. The user input associated with a given vehicle may be determined while the user is within a threshold distance from the vehicle, based on an orientation of a user device 105, or the like. The affinity score may be calculated based on the user input itself (e.g., an image, a video, a note, a search, etc.) or the fact that there is a user input such that the score is agnostic of the content of the user input. User input via a vehicle component may be based on a user's interaction with a vehicle component (e.g., a button provided for feedback, using vehicle features, sitting in a vehicle, touching a wheel, etc.)

According to an implementation, the vehicle affinity score for any given vehicle may be based on a user profile. A user profile may include information determined based on a user 103's behavior and/or may include information provided by the user 103. A user profile may be an existing user profile or a profile that is generated based on the user traversing the space with the one or more vehicles. An existing user profile may be a vehicle-based profile (e.g., created via an application to search or review vehicle profiles), a social media profile, or the like. For example, a user 103 may grant access to a social media page belonging to the user 103 and a determination may be made that the user has uploaded and/or interacted with images of convertible cars. Accordingly, the user 103's profile may indicate a preference for convertible cars. A profile that is generated based on the user 103 traversing the space with one or more vehicles may be generated based on the vehicles that the user 103 favors. For example, if a majority or other proportion of vehicles for which a user location is within a threshold distance of the corresponding vehicle locations are trucks, then the user profile may indicate a preference for trucks.

Accordingly, preferred vehicles may be identified based on the proximity of user locations to the preferred vehicles and/or on vehicle affinity scores associated with the available vehicles. At 212 of FIG. 2, vehicle identification tags corresponding to the preferred vehicles may be provided based on the proximity of user locations to the preferred vehicles and/or on vehicle affinity scores associated with the available vehicles. As disclosed herein, the vehicle identification tags may be generated by the vehicle identification tag module 113 or by the vehicle database 119 and associated with vehicles by the vehicle identification tag module 113.

According to the implementation provided in FIG. 1A, the vehicle identification tag module 113, the vehicle database 119, and/or another component may receive user locations generated at the user location module 117 via the electronic network 125 and may correlate the user locations with the vehicle locations to determine the preferred vehicles. The vehicle identification tags corresponding to the preferred vehicles may be provided to a component (e.g., visualization module 115, user device 105, etc.) at 212.

According to the implementation provided in FIG. 1B, the vehicle identification tag module 113, the vehicle database 119, and/or another component may provide the vehicle location generated at the vehicle scanning module 111 to the user device 105 via the electronic network 125. The user device 105 may correlate the user locations with the vehicle locations to determine the preferred vehicles. The vehicle identification tags corresponding to the preferred vehicles may be used by the user device 105 or may be provided to a component (e.g., visualization module 115) at 212.

At 214 of FIG. 2, vehicle profiles may be generated based on the vehicle identification tags. The vehicle profiles may be generated by receiving information related to the vehicles associated with the vehicle identification tags from the vehicle database. The vehicle profiles may include the vehicle make, model, and/or any vehicle attributes including, but not limited to, vehicle type (e.g., sedan, convertible, SUV, cross-over, coupe, etc.), vehicle color, vehicle rating, vehicle reliability, vehicle cost, vehicle age, vehicle location, vehicle information available, vehicle condition, vehicle history, vehicle mileage, vehicle make, vehicle model, vehicle drive type, vehicle fuel type, vehicle transmission, number or type of cylinders, vehicle features, seller information, or the like. The vehicle profiles may be generated at any applicable component such as the user device 105, vehicle identification tag module 113, visualization module 115, or the like. The vehicle profiles may be generated based on the vehicle identification tags for the respective vehicles or may be generated prior to receiving the vehicle identification tags such that the previously generated vehicle profiles are retrieved based on the vehicle identification tags.

At 216 of FIG. 2, the vehicle profiles for the preferred vehicles may be provided to the user device 105. The visualization module 115 may generate or receive the vehicle profiles and may format the presentation of the vehicle profiles based on one or more of user device 105, an application used to provide the vehicle profiles on a user device 105, user device 105 settings, orientation of user device 105, user preference, or the like, or a combination thereof. The vehicle profiles may be provided via the vehicle database 119, visualization module 115, or a component of the user device 105. For example, in the configuration of FIG. 1A, the vehicle identification tag module may provide the applicable vehicle identification tags to vehicle database via electronic network 125. The vehicle database 119 may provide the corresponding generated vehicle profiles to the visualization module 115 via the electronic network 125 and the visualization module 115 may provide the corresponding vehicle profiles to the user device 105 via the electronic network 125. Alternatively, for example, in the configuration of FIG. 1B, the user device may request the vehicle identification tags for the preferred vehicles from the vehicle identification tag module 113, request and receive the vehicle profiles from the vehicle database 119, provide and receive the vehicle profiles to the visualization module 115 to be rendered, and render the vehicle profiles.

Figure 5A:
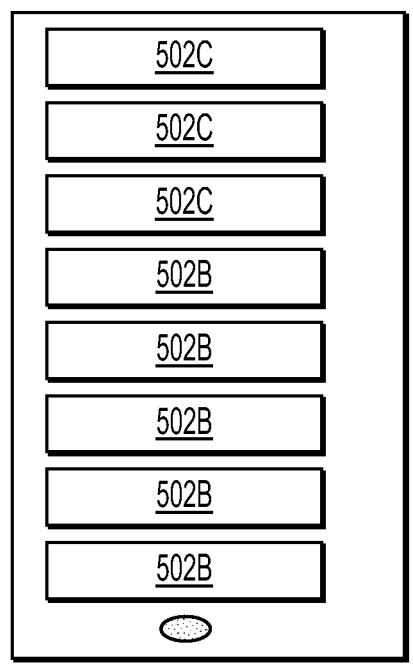
FIG. 5A depicts an exemplary visualization of vehicle profiles, according to one or more embodiments.

FIG. 5A shows an example screen 500 of user device 105. The screen 500 may provide a plurality of vehicle profiles using an application running on the user device 105. The plurality of vehicle profiles may be ordered based on an affinity score such that the vehicle profile corresponding to a vehicle with the highest affinity score may be provided first based on the ranked order. As shown in the example of FIG. 5A, the top three preferred vehicles may be vehicle profiles 502C, which correspond to the vehicles 402C proximate to user 103 in FIG. 4B. Additional profiles 502B of vehicles 402B that are near the user 103 but not within the threshold distance may also be provided if there are not sufficient preferred vehicle profiles 502C available. According to an implementation, a subset of a vehicle profile may be provided to a user on an initial screen (e.g., screen 500 of FIG. 5A) such that upon selection of a specific subset of a vehicle profile (e.g., one of the vehicle profiles 502C, as shown), a full vehicle profile may be accessed. The subset of the vehicle profile may include high level information (e.g., make, model, price, etc.) and the full vehicle profile may include additional details including other vehicle attributes.

FIG. 5B shows another screen 510 of user device 105. As shown, vehicle profiles 502C and additional vehicle profiles 512A, 512B, 512C, 512D, and 512E (512A-512E) may be provided. In addition to vehicle profiles 502C for the preferred vehicles, additional vehicle profiles 512A-512E may be identified based on the vehicle profiles 502C. The additional vehicle profiles 512A-512E may be identified using a machine learning model that receives as inputs some or all of the vehicle profiles 502C for the preferred vehicles. The machine learning model may generate the additional vehicle profiles 512A-512E such that user 103 is likely to be interested in the additional vehicle profiles 512A-512E. Although the additional vehicle profiles 512A-512E may be generated based on the vehicle profiles 502C, the additional vehicle profiles 512A-512E may correspond to vehicles that are dissimilar from the vehicle profiles 502C, as determined by the machine learning model.

FIG. 5C shows another screen 520 of user device 105. As shown, vehicle profiles 502C and additional vehicle profiles 514A-512C may be provided such that additional vehicle profiles 514A correspond to a first vehicle profile 502C, additional vehicle profiles 514B correspond to a second vehicle profile 502C, and additional vehicle profiles 514C correspond to a third vehicle profile 502C. Additional vehicle profiles 514A-514C may be identified based on each respective first vehicle profile 502C, second vehicle profile 502C, and third vehicle profile 502C. The additional vehicle profiles 514A-514C may be identified using a machine learning model that receives as inputs some or all of the first vehicle profile 502C to generate the additional vehicle profiles 514A, the second vehicle profile 502C to generate the additional vehicle profiles 514B for the preferred vehicles, or the third vehicle profile 502C to generate the additional vehicle profiles 514C. The machine learning model may generate the additional vehicle profiles 514A-514C such that user 103 is likely to be interested in the additional vehicle profiles 514A-514C. The user 103 may also be able to see which vehicle profile 502C a given additional vehicle profile 514A-514C is based on to identify similarities between the vehicle profile 502C and the corresponding additional vehicle profiles.

According to implementations, one or more machine learning models may be used to output data used by one or more components to implement the techniques disclosed herein. For example, one or more machine learning models may be used to scan vehicles in a space, identify respective vehicle locations, associate vehicle identification tags with respective vehicles and/or their locations, determine user locations, or the like. The one or more machine learning models may be trained using a dataset including supervised, partially supervised, or unsupervised sample transactional data and associated personal attributes. For example, a learning algorithm (e.g., clustering algorithm, a neural network, a deep learning network, a genetic learning algorithm, or algorithms based on Convolutional Neural Networks (CNN), CNN with multiple-instance learning or multi-label multiple instance learning, Recurrent Neural Networks (RNN), Long-short term memory RNN (LSTM), Gated Recurrent Unit RNN (GRU), graph convolution networks, etc.) may be used by the one or more machine learning models to output the respective data. A machine learning algorithm may be used to generate the one or more machine learning models that output the applicable data.

Figure 3:
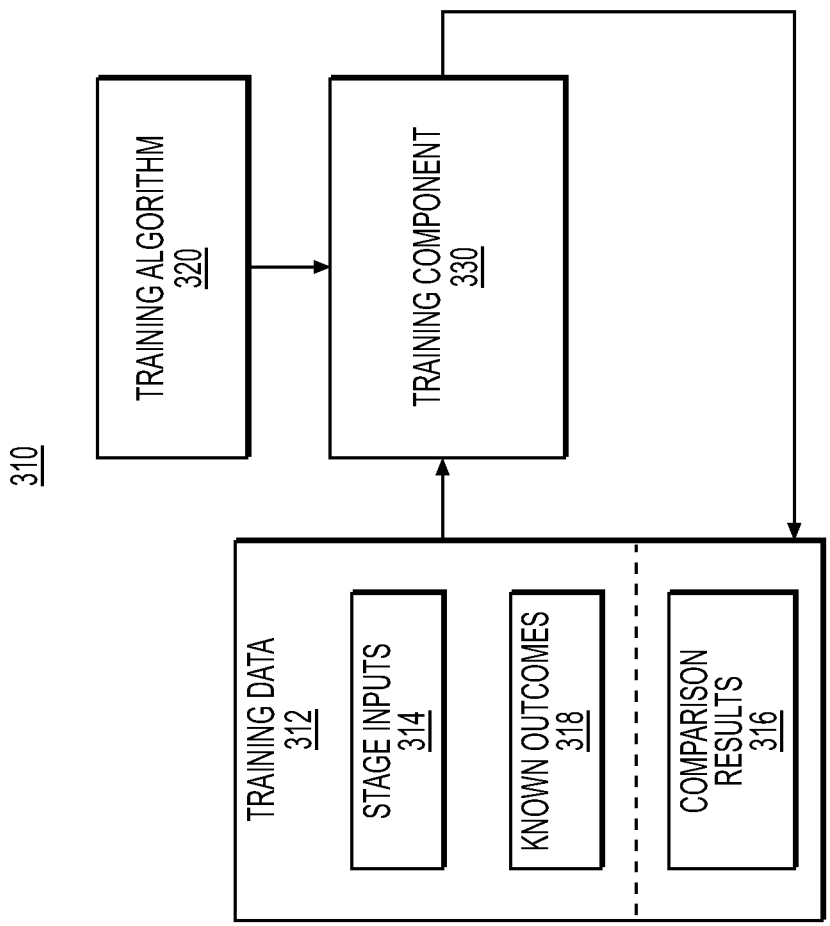
FIG. 3 depicts a flowchart for training a machine learning model, according to one or more embodiments.

As disclosed herein, one or more components of the disclosed subject matter may be implemented using one or more machine learning models. FIG. 3 shows an example training module 310 to train one or more of the machine learning models disclosed herein. It will be understood that a different training module may be used to train each of the machine learning models disclosed herein and/or a single training module 310 may be used to train two or more machine learning models.

As shown in FIG. 3, training data 312 may include one or more of stage inputs 314 and known outcomes 318 related to a machine learning model to be trained. The stage inputs 314 may be from any applicable source including the vehicle scanning module 111, vehicle identification tag module 113, vehicle database 119, user location module 117, an output from a stage (e.g., one or more outputs from a stage from process 200 of FIG. 2), or the like. The known outcomes 318 may be included if the machine learning model is generated based on supervised or semi-supervised training. An unsupervised machine learning model may not be trained using known outcomes 318. Known outcomes 318 may include known or desired outputs for future inputs similar to or in the same category as stage inputs 314 that do not have corresponding known outputs.

The training data 312 and a training algorithm 320 may be provided to a training component 330 that may apply the training data 312 to the training algorithm 320 to generate a machine learning model. According to an implementation, the training component 330 may be provided comparison results 316 that compare a previous output of the corresponding machine learning model to apply the previous result to re-train the machine learning model. The comparison result 316 may be used by the training component 330 to update the corresponding machine learning model. The training algorithm 320 may utilize machine learning networks and/or models including, but not limited to a deep learning network, as disclosed above.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the processes illustrated in FIGS. 2 and 3, may be performed by one or more processors of a computer system, such any of the systems or devices in the computing environments of FIGS. 1A and 1B, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIGS. 1A and 1B. One or more processors of a computer system may be included in a single computing device or distributed among a plurality of computing devices. One or more processors of a computer system may be connected to a data storage device. A memory of the computer system may include the respective memory of each computing device of the plurality of computing devices.

Figure 6:
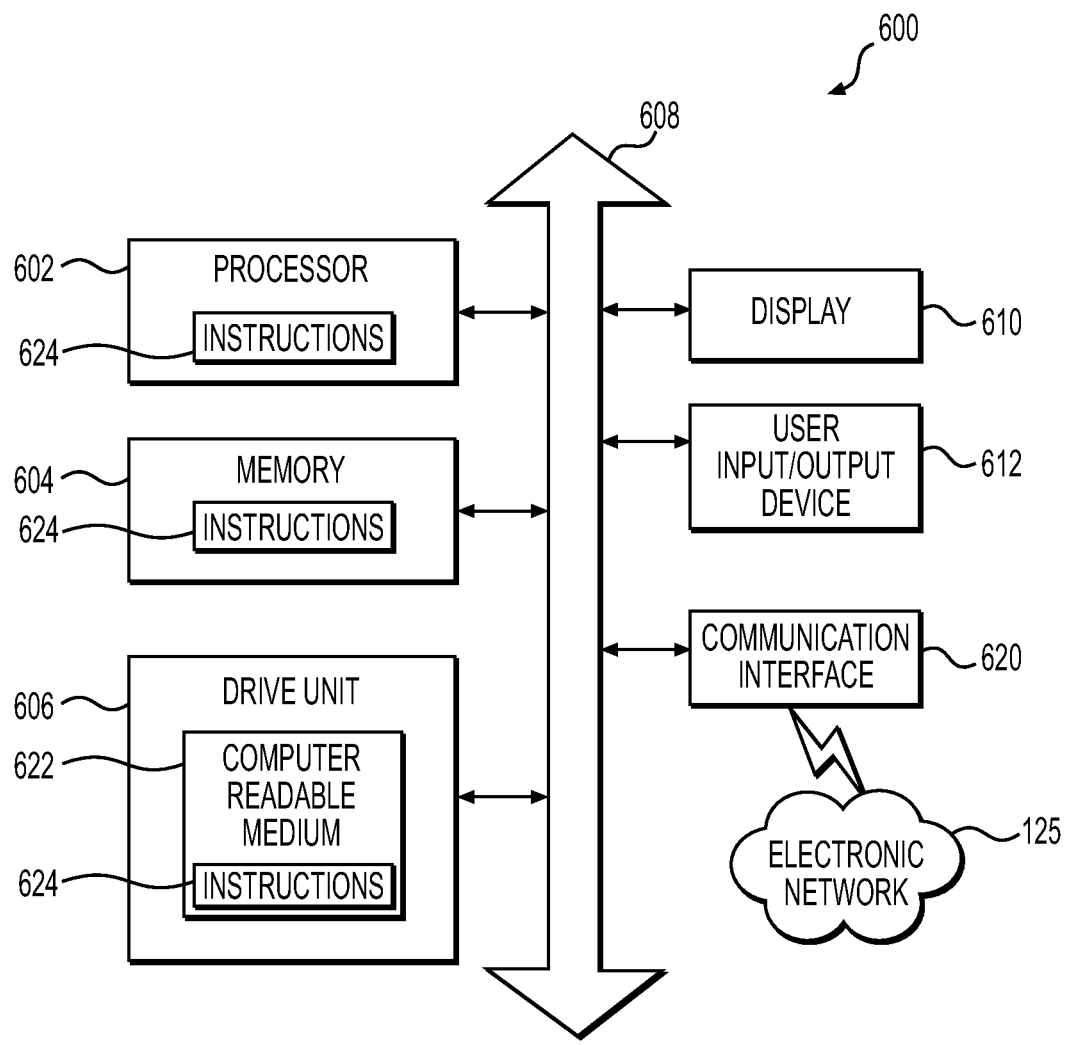
FIG. 6 depicts an example of a computing device, according to one or more embodiments.

FIG. 6 is a simplified functional block diagram of a computer system 600 that may be configured as a device for executing the methods of FIGS. 2 and/or 3, according to exemplary embodiments of the present disclosure. FIG. 6 is a simplified functional block diagram of a computer system that may generate interfaces and/or another system according to exemplary embodiments of the present disclosure. In various embodiments, any of the systems (e.g., computer system 600) herein may be an assembly of hardware including, for example, a data communication interface 620 for packet data communication. The computer system 600 also may include a central processing unit ("CPU") 602, in the form of one or more processors, for executing program instructions. The computer system 600 may include an internal communication bus 608, and a storage unit 606 (such as ROM, HDD, SDD, etc.) that may store data on a computer readable medium 622, although the computer system 600 may receive programming and data via network communications. The computer system 600 may also have a memory 604 (such as RAM) storing instructions 624 for executing techniques presented herein, although the instructions 624 may be stored temporarily or permanently within other modules of computer system 600 (e.g., processor 602 and/or computer readable medium 622). The computer system 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, a mobile device, a wearable device, an application, or the like. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for generating vehicle profiles, the method comprising:
    scanning, using one or more machine learning models, each of a plurality of vehicles, wherein each of the plurality of vehicles is available for acquisition;
    identifying, using the one or more machine learning models, a respective vehicle location for each of the plurality of vehicles based on scanning each of the plurality of vehicles;
    associating, using the one or more machine learning models, a vehicle identification tag with each respective identified vehicle location;
    determining, using the one or more machine learning models, that a user device is within a threshold distance of a first vehicle location of a first vehicle of the plurality of vehicles;
    generating, using the one or more machine learning models, a first vehicle profile corresponding to the first vehicle based on determining that the user device is within the threshold distance and based on associating a respective vehicle identification tag with the first vehicle; and
    causing display of the first vehicle profile via the user device.

2. The computer-implemented method of claim 1, further comprising:
    interpreting, using the one or more machine learning models, a signal to determine a location of the user device, wherein determining that the user device is within the threshold distance of the first vehicle location is based on the interpreted signal.

3. The computer-implemented method of claim 2, wherein the signal corresponds to a Geographical Positioning System (GPS) signal, a nearfield signal, a Bluetooth® signal, a triangulation signal, a beacon signal, a scan signal, or a Radio-Frequency Identification (RFID) signal.

4. The computer-implemented method of claim 1, further comprising:
    providing to the user device, using the one or more machine learning models, first vehicle information corresponding to the first vehicle based on determining that the user device is within the threshold distance.

5. The computer-implemented method of claim 4, further comprising:
    determining a vehicle affinity score;
    wherein providing the first vehicle information corresponding to the first vehicle is further based on whether the vehicle affinity score exceeds an affinity score threshold.

6. The computer-implemented method of claim 5, wherein the vehicle affinity score is determined based on a duration of time that the user device is within the threshold distance of the first vehicle location of the first vehicle.

7. The computer-implemented method of claim 5, wherein the vehicle affinity score is determined based on a user input via one of the user device or a vehicle component.

8. The computer-implemented method of claim 5, wherein the vehicle affinity score is determined based on a user profile.

9. The computer-implemented method of claim 1, further comprising:
    determining, using the one or more machine learning models, that the user device is within the threshold distance of a second vehicle location of a second vehicle of the plurality of vehicles; and
    generating, using the one or more machine learning models, a second vehicle profile corresponding to the second vehicle based on determining that the user device is within the threshold distance of the second vehicle location and based on associating a respective vehicle identification tag with the first vehicle.

10. The computer-implemented method of claim 9, further comprising:
    determining a first affinity score for the first vehicle;
    determining a second affinity score for the second vehicle; and
    causing display of the first vehicle profile and the second vehicle profile via the user device in a display order determined based on the first affinity score and the second affinity score.

11. A system for generating object profiles, the system comprising:
    a memory storing instructions;
    one or more processors configured to execute the instructions to perform operations, including:
        scanning, using one or more machine learning models, each of a plurality of objects, wherein each of the plurality of objects is available for acquisition;
        identifying, using the one or more machine learning models, a respective object location for each of the plurality of objects based on scanning each of the plurality of objects;
        associating, using the one or more machine learning models, an object identification tag with each respective identified object location;
        determining, using the one or more machine learning models, that a user device is within a threshold distance of a first object location of a first object of the plurality of objects;
        generating, using the one or more machine learning models, a first object profile corresponding to the first object based on determining that the user device is within the threshold distance and based on associating a respective object identification tag with the first object; and
        causing display of the first object profile via the user device.

12. The system of claim 11, wherein the operations further include:
    interpreting, using the one or more machine learning models, a signal to determine a location of the user device, wherein determining that the user device is within the threshold distance of the first object location is based on the interpreted signal.

13. The system of claim 12, wherein the signal corresponds to a Geographical Positioning System (GPS) signal, a nearfield signal, a Bluetooth® signal, a triangulation signal, a beacon signal, a scan signal, or a Radio-Frequency Identification (RFID) signal.

14. The system of claim 11, wherein the operations further include:
providing to the user device, using the one or more machine learning models, first object information corresponding to the first object based on determining that the user device is within the threshold distance.

15. The system of claim 14, wherein the operations further include:
determining an object affinity score;
wherein providing the first object information corresponding to the first object is further based on whether the object affinity score exceeds an affinity score threshold.

16. The system of claim 15, wherein the object affinity score is determined based on a duration of time that the user device is within the threshold distance of the first object location of the first object.

17. The system of claim 15, wherein the object affinity score is determined based on a user input via one of the user device or an object component.

18. The system of claim 15, wherein the object affinity score is determined based on a user profile.

19. A computer-implemented method for generating object profiles, the method comprising:
scanning, using one or more machine learning models, each of a plurality of objects, wherein each of the plurality of objects is available for acquisition;
identifying, using the one or more machine learning models, a respective object location for each of the plurality of objects based on scanning each of the plurality of objects;
associating, using the one or more machine learning models, an object identification tag with each respective identified object location;
interpreting, using the one or more machine learning models, a signal to determine a location of a user device;
determining, using the one or more machine learning models and the interpreted signal, that the user device is within a threshold distance of a first object location of a first object of the plurality of objects;
generating, using the one or more machine learning models, a first object profile corresponding to the first object based on determining that the user device is within the threshold distance and based on associating a respective object identification tag with the first object;
providing to the user device, using the one or more machine learning models, the first object profile based on determining that the user device is within the threshold distance; and
causing display of the first object profile via the user device.

20. The method of claim 19, wherein the signal corresponds a Geographical Positioning System (GPS) signal, a nearfield signal, a Bluetooth® signal, a triangulation signal, a beacon signal, a scan signal, or a Radio-Frequency Identification (RFID) signal.

* * * * *